United States Patent [19]
Vollmeyer et al.
[11] 3,761,621
[45] Sept. 25, 1973

[54] METHOD FOR THE TRANSMISSION OF INFORMATION USING TIME MULTIPLEX PRINCIPLES

[75] Inventors: Werner Vollmeyer; Hans-Heinrich Voss, both of Munich, Germany

[73] Assignee: Siemens Aktiengesellschaft, Berlin and Munich, Germany

[22] Filed: Dec. 2, 1971

[21] Appl. No.: 204,146

[30] Foreign Application Priority Data

Dec. 2, 1970 Germany .................. P 20 59 411.0

[52] U.S. Cl. ................................................. 178/50
[51] Int. Cl. ............................................... H04j 3/00
[58] Field of Search .................. 179/15 BA, 15 BV, 179/18 FF, 15 A; 178/50; 340/413

[56] References Cited

UNITED STATES PATENTS

| | | | |
|---|---|---|---|
| 3,535,450 | 10/1970 | Vollmeyer | 178/50 |
| 3,532,827 | 10/1970 | Ewin | 179/18 FF |
| 3,238,298 | 3/1966 | Willis | 179/15 BA |
| 3,422,226 | 1/1969 | Acs | 179/15 BA |
| 3,300,763 | 1/1967 | Hoehmann | 179/15 BA |

*Primary Examiner*—Kathleen H. Claffy
*Assistant Examiner*—David L. Stewart
*Attorney*—Harold J. Birch et al.

[57] ABSTRACT

A method is described for transmitting a plurality of, for example, binary coded messages issuing from a plurality of message channels over a common transmission channel using time multiplex techniques. Even the code element of a message of the shortest duration is scanned repeatedly. For each change in the condition of the modulation waveform of a given message signal, a coresponding signal is transmitted in the form of a binary coded pulse group. The binary coded pulse group is coded to contain information as to the elapsed time between the last preceeding scan of the given message signal and the change in the modulation waveform. The transmission of the aforementioned indicating signal begins simultaneously with the occurrence of the scan of the given message signal next following the change in the modulation waveform. The binary coded pulse group for each modulation waveform is transmitted for the entire duration of the associated given message signal waveform condition. The groups of pulses for each message waveform condition are constituted by the same number of pulses, but each has a different number of pulses of a given polarity.

2 Claims, 4 Drawing Figures

METHOD FOR THE TRANSMISSION OF INFORMATION USING TIME MULTIPLEX PRINCIPLES

BACKGROUND OF THE INVENTION

The invention described herein relates to a method for the transmission of coded message signals issuing from several communication channels over a common channel according to time multiplex principles.

The transmission of a plurality of coded messages by time mutliplex methods is well known in the prior art. In many cases, such messages are coded in binary form. When messages are transmitted in binary coded form, it is essential to transmit indications of changes in the binary states of the message channels associated with the system.

Time multiplex systems are known in which the shortest duration code element in a message is scanned frequently for transmission, and when a change in the modulation waveform of the waveform condition is noted, an indication of this change is transmitted by changing the form of a binary coded pulse group. In such systems, as is known, a given message is transmitted upon the occurrence of a transmission pulse, or when the message is scanned. When a modulation condition change is noted in one of the channels, a transmission in that channel over the common channel is commenced after that change, i.e., a transmitting time pulse is emitted. Several combined transmitting time pulses are used, for the transmission of a binary pulse group.

In U.S. Pat. No. 3,535,450, issued Oct. 20, 1970, to Werner Vollmeyer for a "multiplex transmission method" there is described a system wherein a notification of a change in the binary state of a message signal is transmitted in response to the transmission synchronization pulse, i.e., the scanning pulse, associated therewith that immediately follows the modulation condition change in the message signal that corresponds to the change in its binary state. The time interval corresponding to several transmission synchronization pulses occurring after the modulation condition change is utilized for transmission of the notification signal corresponding to the change in the modulation condition of the message signal.

In the patented system, the notification signals comprise particular combinations of information bits in the form of binary pulse coded groups representative of the times at which changes in the modulation condition of the message signals occur.

The aforementioned patented system and process have certain deficiencies, and it was an object of the invention described in a commonly assigned U.S. patent application Ser. No. 113,970, filed Feb. 9, 1971, by Henrik Muller, to overcome these deficiencies. In the process, which is the subject of the latter application, a start pulse is interposed within the binary coded pulse groups along with pulses which indicate the point in time at which the modulation condition change occurs. The latter start pulse has a polarity which is like that of the message signal being transmitted after the latter modulation condition change. After the transmission of the pulses indicating the point in time of the modulation condition change, again, as far as necessary, the prevailing polarity will again be transmitted.

Therefore, in contradistinction to the system and process described in the aforementioned U.S. patent, the process described in the aforementioned U.S. application contemplates that a start pulse transmitted with the binary coded pulse group, which indicates the beginning of the binary coded pulse group also indicates the new polarity after the change in the modulation waveform. This new polarity is also transmitted after the pulses which contain the information as to the time of occurrence of the modulation change, if the next modulation change does not immediately follow the binary coded pulse groups. The process which is the subject of the aforementioned U.S. application eliminates the need for transmitting a special pulse for indicating a new polarity of the modulation waveform. This, of course, constitutes an improvement over the patented system and process.

A disadvantage has, however, been found in using the time multiplex process, which is the subject of the aforementioned U.S. application. That is, it has been found that during the time segments between binary coded pulse groups no synchronization characteristics are transmitted. Thus, when there is interference in the transmission path, the phase information for synchronization of the system is lost.

For this reason, it is appropriate to transmit changes in pulse polarity for the two possible modulation waveform conditions. Since two polarities, i.e., the zero or the one states, occur in the modulation waveform, two different pulse combinations must be transmitted. Thus, for example, the pulse group 01 can be continuously transmitted for the modulation condition 0 whereas for the other modulation condition 1, the pulse group 10 is transmitted. In this arrangement, pulse polarity changes occur continuously, so that a synchronization process is possible.

However, when there is interference on the transmission path, the synchronization is lost. Thereafter, it is no longer possible to determine which of the two modulation polarities exists, because the two pulse groups differ only in phase.

It is, therefore, an object of this invention to improve the time multiplex modulation processes described in the aforementioned U.S. patents and U.S. application so that after a loss of synchronization by interference, it can be determined rapidly which of the two modulation conditions is being transmitted.

SUMMARY OF THE INVENTION

The aforementioned and other objects are attained in a process according to the principles of this invention in which a specific group of pulses is transmitted for the duration of a prevailing polarity condition of the modulating waveform. A second group of pulses is transmitted for the duration of the other possible prevailing polarity of the modulation waveform. The latter two groups of pulses, or binary coded pulse groups, have the same number of pulses. However, each of the two pulse groups have a different number of pulses of a given polarity. By transmitting the usual pulse groups indicating a change in modulation condition in this manner, it can be rapidly determined which state the modulation signal is in, and the above discussed problems surrounding the presence of interference on the transmission path is avoided.

DETAILED DESCRIPTION OF THE DRAWINGS

Figure 1:
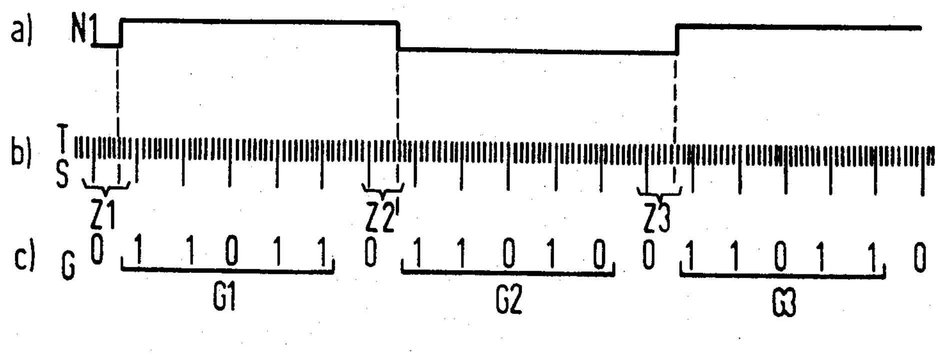
Fig. 1 PRIOR ART
FIG. 1 is a signal-time diagram illustrative of the prior art modulation technique described in U.S. Pat. No. 3,535,450.

In FIG. 1, there is shown a signal-time diagram which illustrates the results of using the modulation process described in U.S. Pat. No. 3,535,450, for which this invention provides an improvement. The graph in FIG. 1*a* illustrates message signal N1, which, for example, may have a step speed of 50 Baud. Thus, the theoretical shortest time duration of each step of the message is 20 milliseconds.

Message N1 is periodically scanned along with other messages so that a time interval equal to period t of a signal having a frequency of 2,400 Hz, as shown in FIG. 1*b* is available for sampling message N1 at times S.

FIG. 1*b* thus shows that the message channel in which message N1 is present is connected to the common transmission path at every eighth period *t*. Seven additional messages (not illustrated) may be similarly periodically sampled and applied to the common transmission path at corresponding time periods *t* occurring between successive cyclic transmission synchronization pulses S of message N1. Therefore, FIG. 1 is exemplary of a time multiplex transmission of eight messages.

Message signal N1 may assume one of two electrical states corresponding to two binary states, if it is assumed that it is transmitted in binary form. Changes between binary states, as indicated by a change in the modulation condition of message signal N1, causes the transmission of a corresponding binary coded pulse group G, as shown in FIG. 1*c*, which fixes the points in time at which the changes in the modulation waveform occur. A counting system is employed to determine the time between successive transmission synchronization pulses S at which a change in the modulation condition of message N1 occurs. If such a change occurs between two transmission synchronization pulses S, the counting process is stopped and the existing count is converted into a corresponding binary coded pulse group for transmission to the common transmission path when the succeeding transmission synchronization pulse S effects sampling of channel N1. Time slots are thus defined between successive points in time designated S. These are not necessarily representative of synchronization pulses, however, because other conventional methods can be used for the synchronization pulses.

Thus, the sampled signal is transmitted to the common transmission path only if a change in the modulation condition of message N1 occurs. If the same modulation condition exists over an extended period of time, and more particularly, over the time interval of several transmission synchronization pulses S, a sampled signal is not applied to the common transmission path until the modulation conditions thereof changes.

In FIG. 1, a count Z1 corresponds to the time at which the first change in the modulation condition of message N1 occurs, as measured from the last occurring transmission synchronization pulse. As previously explained, the count is converted into a binary coded pulse group corresponding to the time at which the modulation condition changes. Thus, binary coded pulse group G1 corresponds to count Z1 and is applied to the common transmission path in response to the next transmission synchronization signal S. The time of the second change in the modulation condition of message N1 is represented by count Z2, and the time of the third change by count Z3. Binary coded pulse groups G2 and G3 are representative of counts Z2 and Z3, respectively.

The aforementioned binary coded pulse group is constituted by five information bits. The first bit always has the same binary condition which, as shown in FIG. 1, may be assumed to be binary 1. Thus, the first bit of each binary coded pulse group G1 is equal to binary 1 and is representative of the start criterion to inform the receiver tha the succeeding four bits should be evaluated as information relating to exchange in the modulation condition of the message. The second, third and fourth bits are representative of the count of the counting system in binary code, and thus, comprise counts corresponding to Z1, Z2 or Z3 in binary form. The count may be derived, for example, by determining the number of scanning pulses T that occur from initiation of the count in response to a transmission synchronization pulse S until a change in modulation condition of the message occurs. The fifth bit of the binary coded pulse group G1 is indicative of the modulation condition that exists after the change in modulation condition occurs. Thus, binary 0 and 1 are alternately transmitted to the common transmission path by successive binary coded pulse groups as the fifth bit thereof.

According to the patented system and process, if a binary coded pulse group is not transmitted to the common transmission path, in response to a transmission synchronization pulse S, a signal is applied to the common transmission path that is opposite to the modulation condition indicative of the start signal. Thus, assuming that the start signal is equal to binary 1, a binary 0 would then be applied to the common transmission path.

Figure 2:
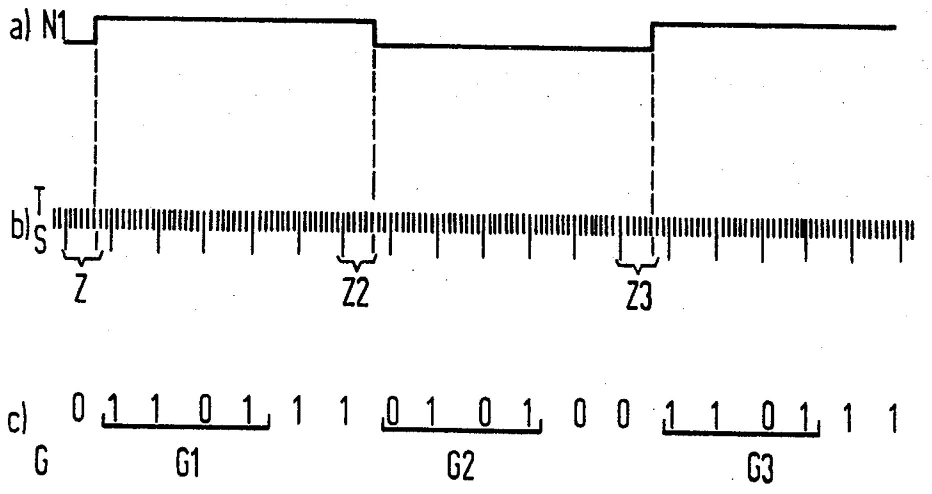
Fig. 2 PRIOR ART
FIG. 2 is a signal-time diagram illustrative of the modulation technique described in the above referenced U.S. application Ser. No. 113,970.

FIG. 2 illustrates, by means of a signal-time diagram, the improvement on the above described patented system and process described in U.S. application Ser. No. 113,970. In FIG. 2, the reference letters and numerals correspond to those in FIG. 1. As can be seen from this Figure, a start pulse of the pulse groups G1-3 is interposed within these binary coded pulse groups along with pulses for indicating the point in time at which the change in condition of the modulation waveform has occurred. This start pulse has a polarity which corresponds to that of the message signal being transmitted after the change in the waveform has occurred. After the transmission of the pulses indicating the time of waveform change, a pulse indicative of the message polarity is again transmitted. For a further description of this process, reference may be had to the aforementioned, commonly assigned U.S. application Ser. No. 113,970.

Figure 3:
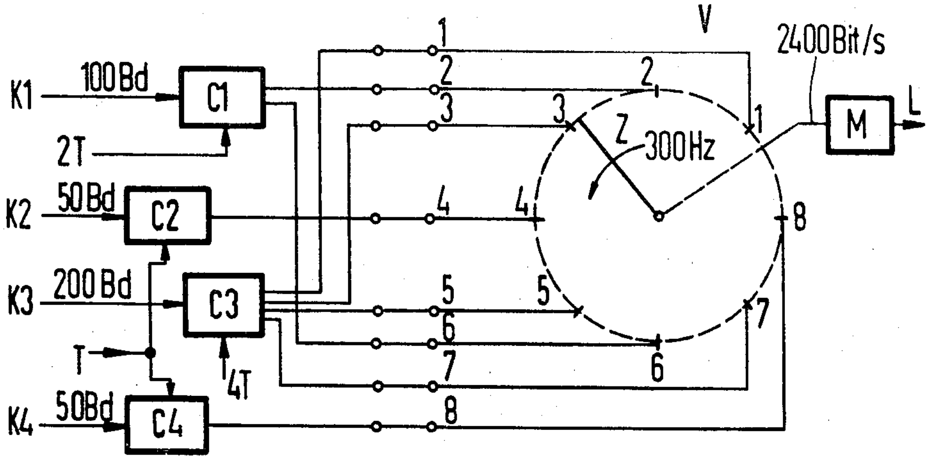
FIG. 3 is a schematic diagram of a preferred form of circuitry for executing the method of this invention and FIG. 4 is a signal-time diagram illustrative of the waveform resulting from the modulation process of this invention.

FIG. 3 is a schematic diagram illustrative of circuitry which may be used to perform the method of this invention. It will be noted that this circuitry corresponds with that described in U.S. Pat. No. 3,535,450. In particular, the apparatus described in FIG. 3 of that patent can be used. In order to perform the method described herein it is necessary only to change the coders C1 through C4 in this apparatus to produce the binary code group in accordance with this invention; these coders are only conventional binary counting systems, which those skilled in the art can readily modify in order to produce the binary code group described herein.

In the example described by this Figure, 850 Baud channels are associated with a common transmission line L. Each of the channels 1 through 8 has a coder that is scanned during an associated period of scanning synchronization frequency T equal to 2,400 Hz. Thus, all eight channels are sampled at a transmission synchronization pulse frequency S, equal to 300 Hz., and the phase position associated with the sampling of each of the either channels is different. It should be noted that these transmission rate and scanning rate parameters are only exemplary, and any suitable parameters may be used within the scope of this invention.

The eight message channels have higher telegraphy speeds. Thus, in FIG. 3, four channels K1 through K4 having different speeds may be employed. Message channels K1 through K4 are, respectively, connected to coders C1 through C4. The output signals of the coders are applied to distributor V, the mode of operation of which is well known and therefore, shown only symbolically in the form of a rotating selector V which rotates at a speed of the synchronization transmission signals S.

Connection of selector Z to the outputs of coders C1 through C4 effects application of the corresponding sampled messages to a modulator M, and thereby to common transmission line L. To simplify the circuit, modulator M may be removed or an electronic delay may be substituted therefor.

Coders C1 through C4 comprise well known counting systems and produce binary coded pulse groups, when changes in the modulation condition of the associated message signal occur, as explained hereinabove. These binary coded pulse groups are applied to common transmission path L by distributor V in a time interleaved fashion. Coders C1 through C4 are similar and operate at a transmission speed of, for example, 50 Baud with a scanning synchronization frequency equal, in this example, to 240 Hz.

Figure 4:
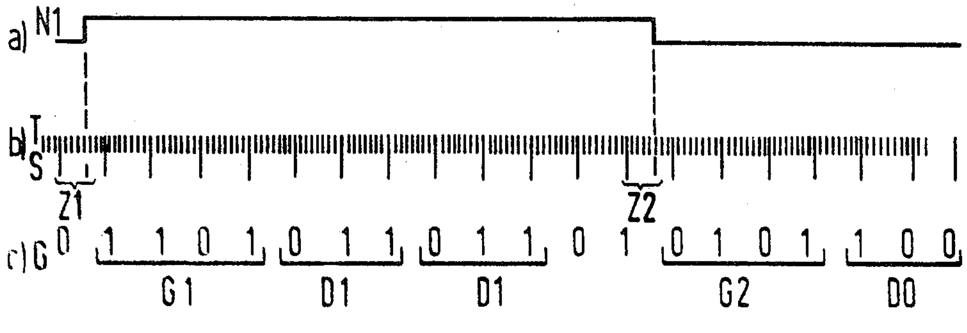

The circuitry in FIG. 3 may be used to obtain the signal-timing results, according to the invention, illustrated in FIG. 4. In order to perform this invention utilizing the FIG. 3 circuitry, it will be necessary only to adjust the coders accordingly.

The reference letters and numerals in FIG. 4 correspond to those in FIGS. 1 and 2, so that the message signal, the timing pulses and the binary pulse groups are indicated in a like manner.

In the FIG. 4 example of the invention, is comtemplated that, even in the presence of interference, it can be determined after three pulses of one of the pulse groups G which state the modulation signal is in. A specific combination of steps is assigned to each modulation condition. By this means, the two pulse groups may not merge into each other through a phase shifting. Thus, for example, the pulse group 001 is transmitted for the modulation waveform condition 0, and the pulse group 110 is transmitted for the modulation level 1. This method enables the recognition of the modulation conditon after merely three steps. The new method transmits two differential pulse groups for the modulation conditon, which, however, contain a sufficient number of synchronization characteristics.

The preferred form for execution of this invention described hereinabove is intended to be only exemplary, and it is contemplated that a number of modifications thereto, or a number of changes in the parameters may occur to those skilled in the art. The scope of the invention is defined by the appended claims, and it is contemplated that many such modifications or changes in parameters will be within the scope of these claims.

We claim:

1. A method for transmitting over a common channel a plurality of message signals issuing from a plurality of message channels using time multiplex techniques wherein even the code element of shortest duration is scanned a plurality of times and with each change in waveform of the message signal a corresponding indicating signal is transmitted over the common channel, said indicating signal being a binary coded pulse group, said binary coded pulse group for each message signal containing information as to the elapsed time between the preceding scan of that message signal and a change in waveform thereof, the transmission of said indicating signal taking place upon the occurrence of the next scan of that message signal, comprising the steps of:

transmitting a first binary pulse group for the duration of a first condition of the message signal waveform and transmitting a second binary pulse group for the duration of a second condition of the message signal waveform, said first and second binary pulse groups being constituted by the same number of pulses but having different numbers of pulses of a given polarity.

2. The method defined in claim 1 wherein said binary pulse groups are constituted by three pulses and wherein said first binary pulse group has two pulses of like polarity, said second binary pulse group having twp pulses of like polarity opposite to the polarity of the like polarity pulses of said first pulse group.

* * * * *